Feb. 12, 1952 W. L. KEEFER 2,585,657
SHOT TESTING
Filed Dec. 11, 1947 4 Sheets-Sheet 1

Inventor
WALTER L. KEEFER,
By Wall + Houghton
Attorneys

Feb. 12, 1952 W. L. KEEFER 2,585,657
SHOT TESTING
Filed Dec. 11, 1947 4 Sheets-Sheet 2

INVENTOR
WALTER L. KEEFER,
By Hall + Houghton
Attorneys

Feb. 12, 1952 W. L. KEEFER 2,585,657
SHOT TESTING
Filed Dec. 11, 1947 4 Sheets-Sheet 3
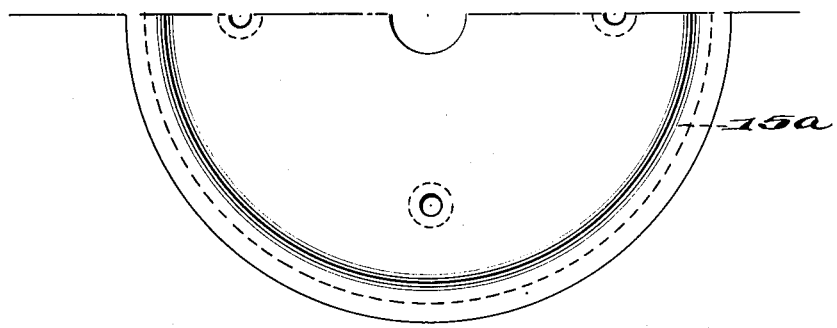
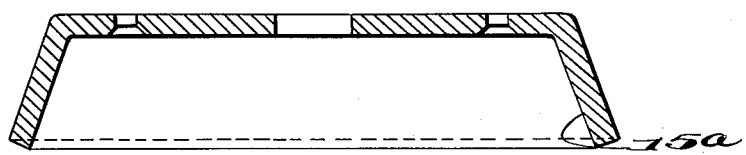
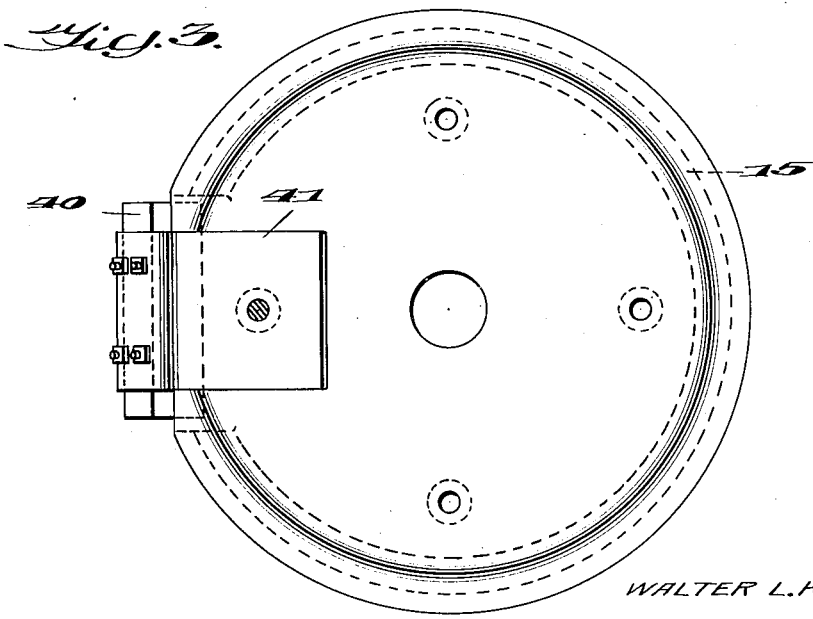
Inventor
WALTER L. KEEFER,
By Hall + Houghton
Attorneys Feb. 12, 1952 W. L. KEEFER 2,585,657
SHOT TESTING Filed Dec. 11, 1947 4 Sheets-Sheet 4

Inventor
WALTER L. KEEFER,

By Hall + Houghton
Attorneys

Patented Feb. 12, 1952

2,585,657

UNITED STATES PATENT OFFICE 2,585,657

SHOT TESTING

Walter L. Keefer, Hagerstown, Md., assignor to Pangborn Corporation, Hagerstown, Md., a corporation of Maryland Application December 11, 1947, Serial No. 791,135

5 Claims. (Cl. 73—12)

This invention relates to shot testing and the like. It aims to provide a device for testing metal shot and similar blast-treating material. Such materials are employed in the surface treatment of castings, forgings and other parts by impingement of the treating material thereagainst.

The present invention has for one object the testing of abrasive or like broken or unbroken shot by impacting it against an anvil until it becomes disintegrated to a subtantial extent. The degree of disintegration may be determined by screen analysis. The percentage of disintegration may be controlled by the number of times the material is impacted against the anvil. The quality of the material may be suitably indicated, as by the number of impingement passes required to produce a predetermined degree of disintegration.

At a later date, a sample of the material being manufactured may be tested under like conditions to determine if the quality is up to standard. Similarly, competitive brands may be tested to determine their relative quality.

The device of the invention is also preferably equipped so it may be operated with a peening strip, and so the velocity of projection may be adjusted to develop a predetermined peen number on the strip. This may be measured as the curvative of the strip in thousandths of an inch departure from a straight or like reference line, resulting from the material impacting one side of the strip and causing it to bow.

Thus where parts are being processed by peening of their metal surfaces to increase the fatigue life thereof, the peen number being known, samples of the peening materials may be compared by testing at substantially the same peen number.

Further objects and advantages of the invention will be apparent from the detailed description, hereinafter, of an illustrative embodiment of the invention.

With the general objects of the invention in view, the invention consists in the combinations of parts, herein described and claimed.

In the accompanying drawings forming a part of this specification:

Fig. 3 is a detail plan of the anvil shown therein.

Figs. 4 and 5 are partial plan and sectional elevation views of a second testing anvil.

Figure 1:
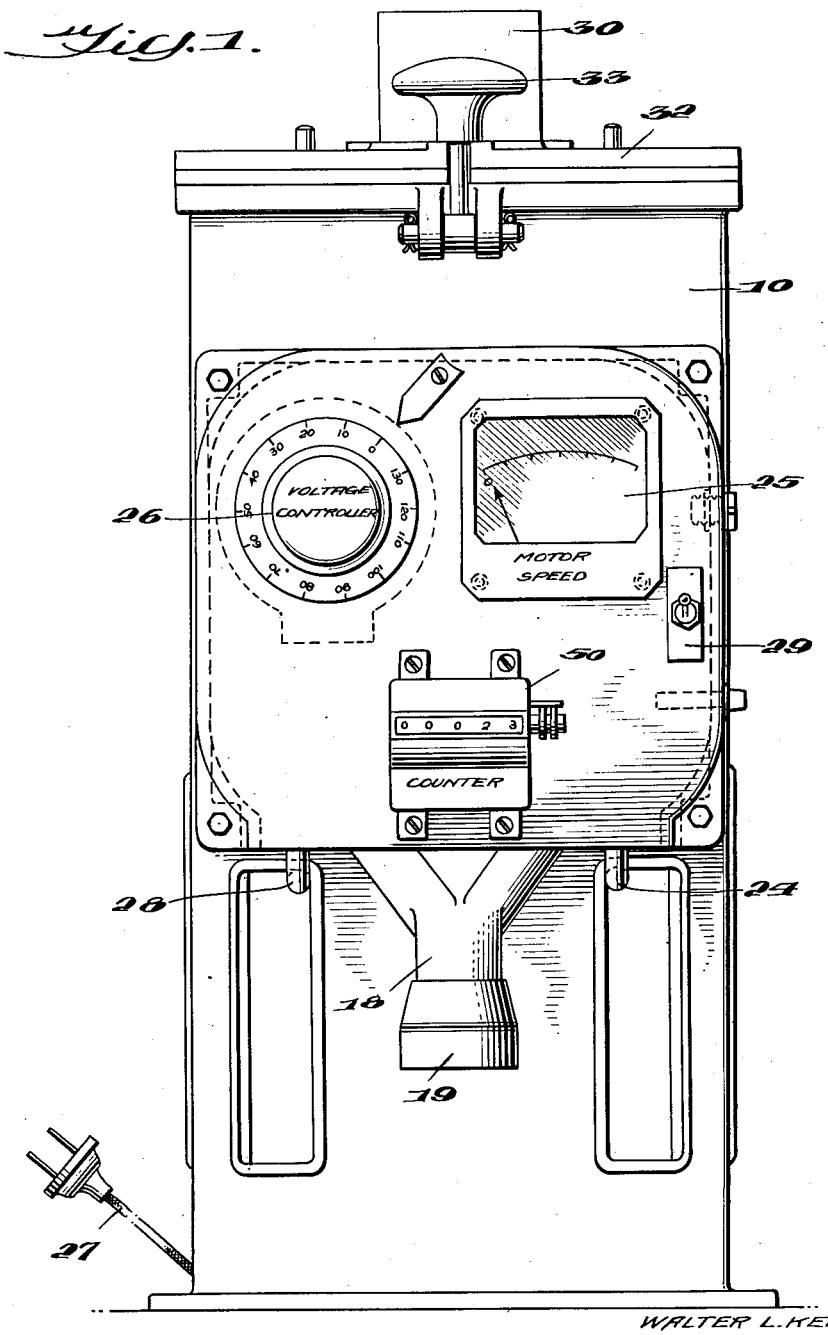
Fig. 1 is a front elevation of a shot tester exemplifying the invention.
Figure 2:
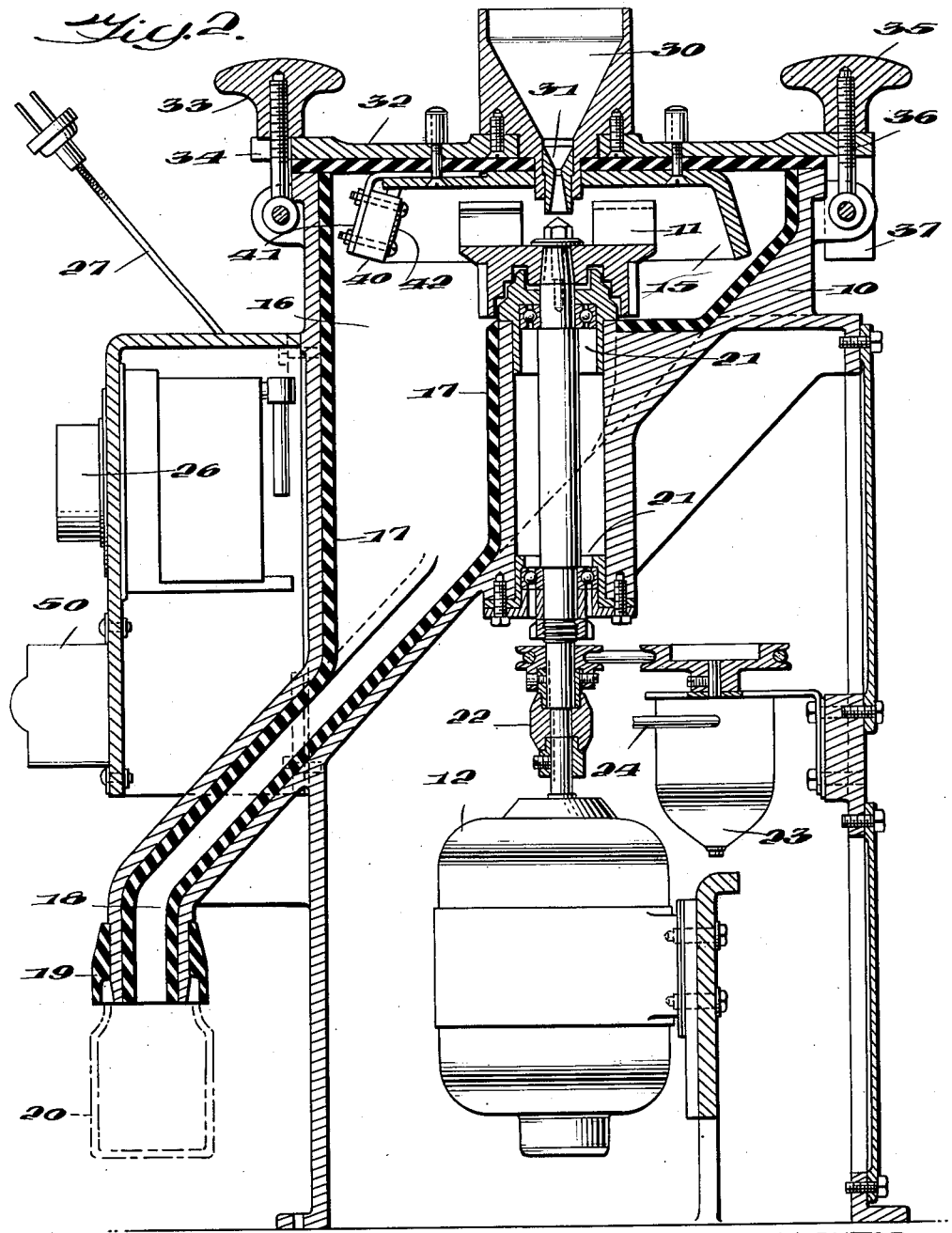
Fig. 2 is a vertical section therethrough.

As is shown in Figs. 1 and 2 the tester comprises a housing 10 in which is mounted a relatively small, high speed centrifugal projector 11 driven by suitable means, as a motor 12. The projector is preferably of the radially-bladed type, and preferably has four blades. Surrounding the projector 11 is an anvil having its wall 15 inclined to the plane of projection of the projector 11, to intercept the projected shot and deflect it out of the plane of projection. In this way return of the shot into the wheel 11 and consequent uncontrolled disintegration is prevented.

The shot rebounding from the anvil 15 is collected in a hopper-like space 16, which is preferably lined with rubber or like resilient and abrasion-resisting material 17, as shown. This hopper delivers the treated shot to a spout 18, which may have a rubber sleeve 19 mounted thereon to frictionally retain a collector can or jar, indicated at 20, Fig. 2, and which is also preferably rubber-lined.

In the form shown, the projector may have a suitable diameter, say four to six inches, and the anvil may be proportioned thereto about as shown, its diameter being, say seven to nine inches in these exemplifying instances. It is desirable to have the anvil spaced from the projector only sufficiently to insure reflection of the shot to a region not occupied by the projector.

In the preferred form shown in Fig. 2, the projector is advantageously mounted in bearings 21 to rotate on a vertical axis and discharge the shot in a horizontal plane, is of the radially-bladed type, has four blades, and is provided with a conical center to the apex of which the shot is delivered. The driving means is preferably a variable speed electric motor 12 connected to the projector shaft by a suitable coupling 22. Motor speeds of 2,000 to 12,000 R. P. M. have been used.

Means is preferably provided to enable the speed of the projector to be controlled, herein by providing the device with an electric tachometer 23, belt-driven from the rotor shaft, and connected by a suitable cable 24 to a speed indicator 25 (Fig. 1), and with a suitable voltage controller 26 connected in the circuit between the appliance cord 27 (Fig. 2) and the motor leads 28. A suitable switch 29 is also provided, preferably in the circuit of appliance cord 27.

In the preferred form of the invention shown, the anvil 15 is mounted to overlie the projector 11 and depend in surrounding relation thereto, and is positioned at an outwardly and downwardly inclined angle of incidence relative to the plane of projection of the shot, so that both the direction of reflection of the shot and the action of gravity deflects the shot downwardly and out of the plane of projection of the wheel 11.

Suitable means is provided for delivering the shot to be tested to the projector. As shown this means preferably comprises a hopper 30 having a restricted outlet 31 delivering to the center of the projector 11. As the preferred form shows, the outlet 31 is preferably large enough to feed the largest shot substantially in sequential array. The shot elements are thus thrown individually against the anvil 15 and rebound therefrom substantially without any such impingement against one another as is likely to augment the disintegration produced by the anvil.

In the preferred form the hopper 30 and anvil 15 are carried by the removable cover plate 32, as shown, this plate being provided with suitable securing means, as the front pivot bolt 33 engaging ears 34, and the rear pivot bolt 35 passing through bolt hole 36 which, with the depending tilt lugs 37, allows the cover to be loosened and tilted back thereon, thus affording a particularly convenient assembly.

In the form shown in Figs. 2 and 3, the anvil member 15 is provided with a peen block 40 carried by a suitable support 41 and provided with means to hold a peen strip 42 at substantially the same angle of inclination as that of the inside anvil face 15.

By use of this form, the speed of the projector 11 may be adjusted to develop a predetermined peen member on the strip.

After the proper speed of the machine for testing at a particular peen number is determined, actual testing of abrasive is effected using plain anvils of suitable or preferred form.

In the form shown in Figs. 4 and 5 the plain anvil is a simple annulus having its inside walls 15a flared at an angle of about fifteen degrees. Using a rotor having a blade diameter of about four and one-half inches, this anvil may have an inside diameter of about seven and one-half inches. By not departing greatly from such size the machine may be kept compact, and the abrasive under test may be intercepted immediately after it leaves the projecting wheel 11, yet the spacing from the wheel is sufficient for the abrasive rebounding from the anvil 15 to pass downwardly about the wheel with substantially no tendency for any whole or broken abrasive to fly back into the wheel.

Figure 6:
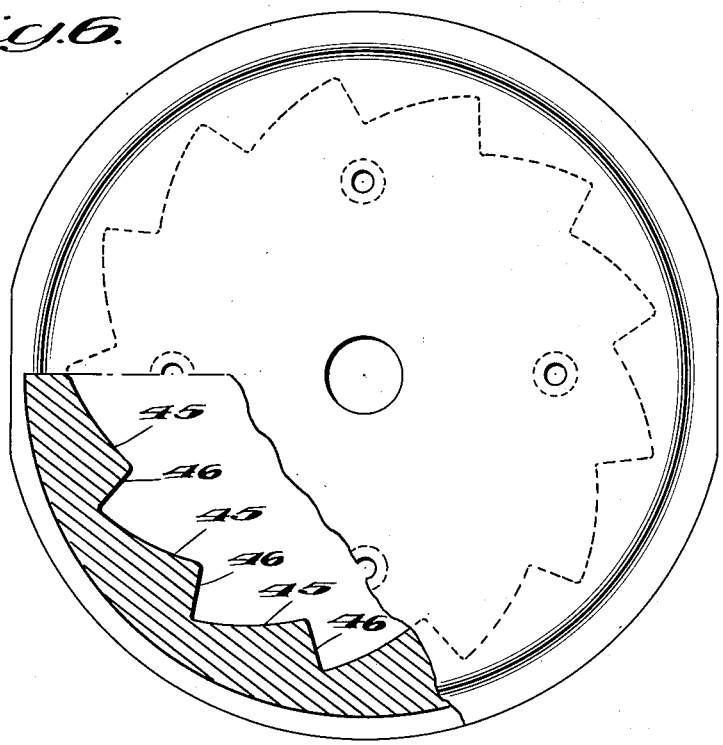
Figs. 6 and 7 are plan and sectional elevation views of a third form of anvil, the plan view being partially cut away.
Figure 7:
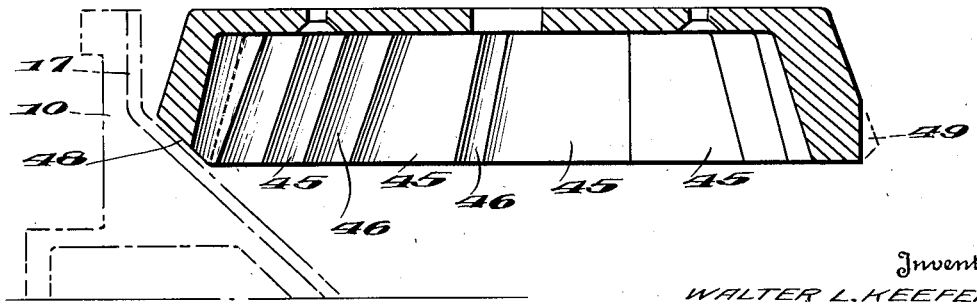

The anvil of Figs. 6 and 7 is provided with a special form of toothed inner surface which breaks up abrasive faster than the form of Figs. 4 and 5. In the form of Figs. 6 and 7 the anvil surface is subdivided into a number of segmental impact walls 45 separated by division walls 46. Its annular section is thus somewhat thicker, and its front and rear edges are cut away at 48 and 49 outside its impact receiving regions, to minimize the size of the machine. The division walls 46 are positioned substantially tangent to the root projection circle of the projector 11 with which the anvil is to be used, and not tangent to the periphery of the blade diameter of the wheel 11.

Because the wheel imparts both radial and tangential velocity to the abrasive, it leaves a radially-bladed wheel at an average angle of about forty degrees to tangency; i. e., as though projected tangentially from a root circle of about three-fourths of the diameter of the actual wheel. In the embodiment shown, with a radially-bladed wheel of four and one-half inch diameter the root circle has a diameter of about three and three-eighths inches. The segmental impact walls in this case are preferably about thirteen in number, and have their median radial planes substantially tangent to the root circle and their radii of curvature substantially equal to their median planar distances from said points of tangency. Thus the shot under test statistically impacts the segmental walls at angles departing from the normal substantially only to the extent of inclination of the anvil walls to the plane of discharge of the wheel. This angle of inclination, as shown in Fig. 7, preferably is about fifteen degrees.

In the case of the anvil of Figs. 4 and 5, by contrast, the average or statistical angle of impact is much less due to the abrasive leaving the rotor 11 at approximately forty degrees from the tangent to its periphery. However, this reduction of impact angle may be compensated for to a considerable extent by increasing the speed of the rotor 11.

By virtue of the features disclosed, it is possible to practice a method in which the shot under test is centrifugally accelerated during radial movement thereof only a little over two inches, and intercepted after it has traveled but a few more inches by impinging it against an anvil held at an angle of incidence inclined to the plane of the stream to cause the shot to rebound out of range of the wheel. The shot, statistically, receives identical treatment in each impinging pass. Thus the number of passes to produce a given degree of disintegration or fracture of the shot by impacts comparable to those to which it is subjected in actual blasting operations well reflects the character of the shot. A counter 50 (Fig. 1) may be provided for keeping track of the number of times a sample of shot is passed through the impinging step.

This mode of testing also enables ready establishment of the velocity of a peening wheel necessary to meet a peening specification with a particular peening agent. The functional relation between the rates and distances of projections used in the test and those to be encountered in the actual peening operation can be determined, and the velocity of the tester to develop a given peen number will then indicate the velocity to be imparted to the actual peening wheel. Thus the present invention provides an effective method of matching the speed of a centrifugal projector to the characteristics of the treating material to be employed.

While the invention has been described with reference to preferred embodiments of apparatus, it is not limited thereto, but is defined in the appended claims.

I claim:

1. A shot tester comprising a casing, a centrifugal projector mounted within the casing to rotate about a vertical axis and discharge material projected thereby in a horizontal plane, said casing having a hinged cover overlying said projector, a hopper having a delivery outlet extending through said cover and delivering centrally to said projector, a ring-like anvil carried by said cover and extending around said projector, said anvil having walls inclined downwardly and outwardly with respect to the plane of projection of said projector, and means for rotating said projector.

2. The combination as defined by claim 1 in which the anvil carries a detachable impingement strip as part of the surface of said downwardly and outwardly inclined walls.

3. A shot tester anvil, for use with a centrifugal projector which throws shot from its periphery with tangential and radial components of velocity imparting a direction thereto corresponding to tangential projection from a root-circle of less diameter than that of said projector, comprising a ring-like anvil surface surrounding said projector and having its inner wall divided into a number of segmental walls separated by division walls substantially tangent to the root-circle of the projector, said segmental walls being in the form of arcuate surfaces having their median radial planes substantially tangent to said root-circle and their radii of curvature approximately equal to their median planar distances from said points of tangency, said segmental walls being inclined to the axis of the anvil, whereby shot projected with the projector located centrally of the anvil statistically impacts said segmental walls at angles departing from the normal substantially only to the extent of axial inclination of the anvil walls.

4. A shot tester anvil according to claim 3, for use with a projector having its peripheral and root-circle of diameters exemplified by the ratio of about four and one-half inches to three and three-eighths inches; said anvil having approximately thirteen segmental walls inclined axially at about fifteen degrees and with their radii of curvature of the relative order exemplified by about three and three-fourths to four inches in the impact receiving regions thereof.

5. In a shot tester a centrifugal projector for peripherally throwing shot with tangential and radial components of velocity imparting a direction thereto corresponding to tangential projection from a root-circle of less diameter than that of said projector, a ring-like anvil surface surrounding said projector and having its inner wall divided into a number of segmental walls separated by division walls substantially tangent to the root-circle of the projector, said segmental walls being in the form of arcuate surfaces having their median radial planes substantially tangent to said root-circle and their radii of curvature approximately equal to their median planar distances from said points of tangency, said segmental walls being inclined to the axis of the anvil, whereby shot projected with the projector located centrally of the anvil statistically impacts said segmental walls at angles departing from the normal substantially only to the extent of axial inclination of the anvil walls.

WALTER L. KEEFER.

REFERENCES CITED

The following references are of record in the file of this patent:

UNITED STATES PATENTS

| Number | Name | Date |
|---|---|---|
| 1,267,110 | Parsons et al. | May 21, 1918 |
| 1,532,742 | Hadsel | Apr. 7, 1925 |
| 2,225,934 | Stark | Dec. 24, 1940 |
| 2,357,843 | Morrissey | Sept. 12, 1944 |
| 2,338,591 | Learmonth | Jan. 4, 1944 |

OTHER REFERENCES

An article entitled, "Shot Break Down Tester," pgs. 49–53 in the pamphlet, "Shot Peening," 2nd edition, copyright 1946, published by the American Wheelabrator and Equipment Co. (A copy may be found in Division 13 of the U. S. Patent Office in class 29, subclass 90B.)